(12) United States Patent
Singh

(10) Patent No.: US 6,584,531 B1
(45) Date of Patent: Jun. 24, 2003

(54) ARBITRATION CIRCUIT WITH PLURAL ARBITRATION PROCESSORS USING MEMORY BANK HISTORY

(75) Inventor: Rajesh Singh, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/559,193

(22) Filed: Apr. 27, 2000

(51) Int. Cl.[7] .................................................. G06F 1/00
(52) U.S. Cl. ........................ 710/244; 710/111; 710/113; 710/122
(58) Field of Search ................................. 710/107, 110, 710/111, 113, 116, 311, 316–317, 241, 243, 244, 122; 709/214, 216, 244; 711/117, 110, 115, 147, 149, 151

(56) References Cited

U.S. PATENT DOCUMENTS

| | | | | |
|---|---|---|---|---|
| 5,197,130 A | * | 3/1993 | Chen et al. ................. | 710/316 |
| 5,481,680 A | * | 1/1996 | Larson et al. ............... | 710/112 |
| 5,557,753 A | * | 9/1996 | Suenaga et al. ............ | 710/107 |
| 5,623,672 A | * | 4/1997 | Popat ......................... | 710/241 |
| 5,710,549 A | * | 1/1998 | Horst et al. ............... | 340/825.5 |
| 5,761,455 A | * | 6/1998 | King et al. ................. | 710/316 |
| 5,878,240 A | * | 3/1999 | Tomko ....................... | 710/316 |
| 5,941,979 A | * | 8/1999 | Lentz et al. .................. | 712/33 |
| 6,073,199 A | * | 6/2000 | Cohen et al. ............... | 710/113 |
| 6,202,137 B1 | * | 3/2001 | Ottinger ..................... | 711/168 |
| 6,230,229 B1 | * | 5/2001 | Van Krevelen et al. ..... | 710/316 |
| 6,321,284 B1 | * | 11/2001 | Shinohara et al. .......... | 710/113 |
| 6,401,176 B1 | * | 6/2002 | Fadavi-Ardekani et al. | 711/151 |
| 6,467,002 B1 | * | 10/2002 | Yang .......................... | 710/116 |

* cited by examiner

Primary Examiner—Paul R. Myers
Assistant Examiner—Raymond N Phan
(74) Attorney, Agent, or Firm—Westman, Champlin & Kelly

(57) ABSTRACT

A method and apparatus for arbitrating access to a memory, which has a plurality of banks. The method includes arbitrating with a plurality of processors. Each processor is associated with one of a plurality of data ports and has a plurality of arbitration cycles, including a current cycle and a most recent cycle preceding the current cycle. Each processor receives memory access requests from all of the data ports, wherein each memory access request is associated with one of the memory banks. Each processor selectively grants the data port associated with that processor access to the memory for the current cycle based on the banks associated with the memory access requests of each data port, the data port that was granted access to the memory during the preceding cycle, and the memory bank that was accessed during the preceding cycle.

15 Claims, 7 Drawing Sheets

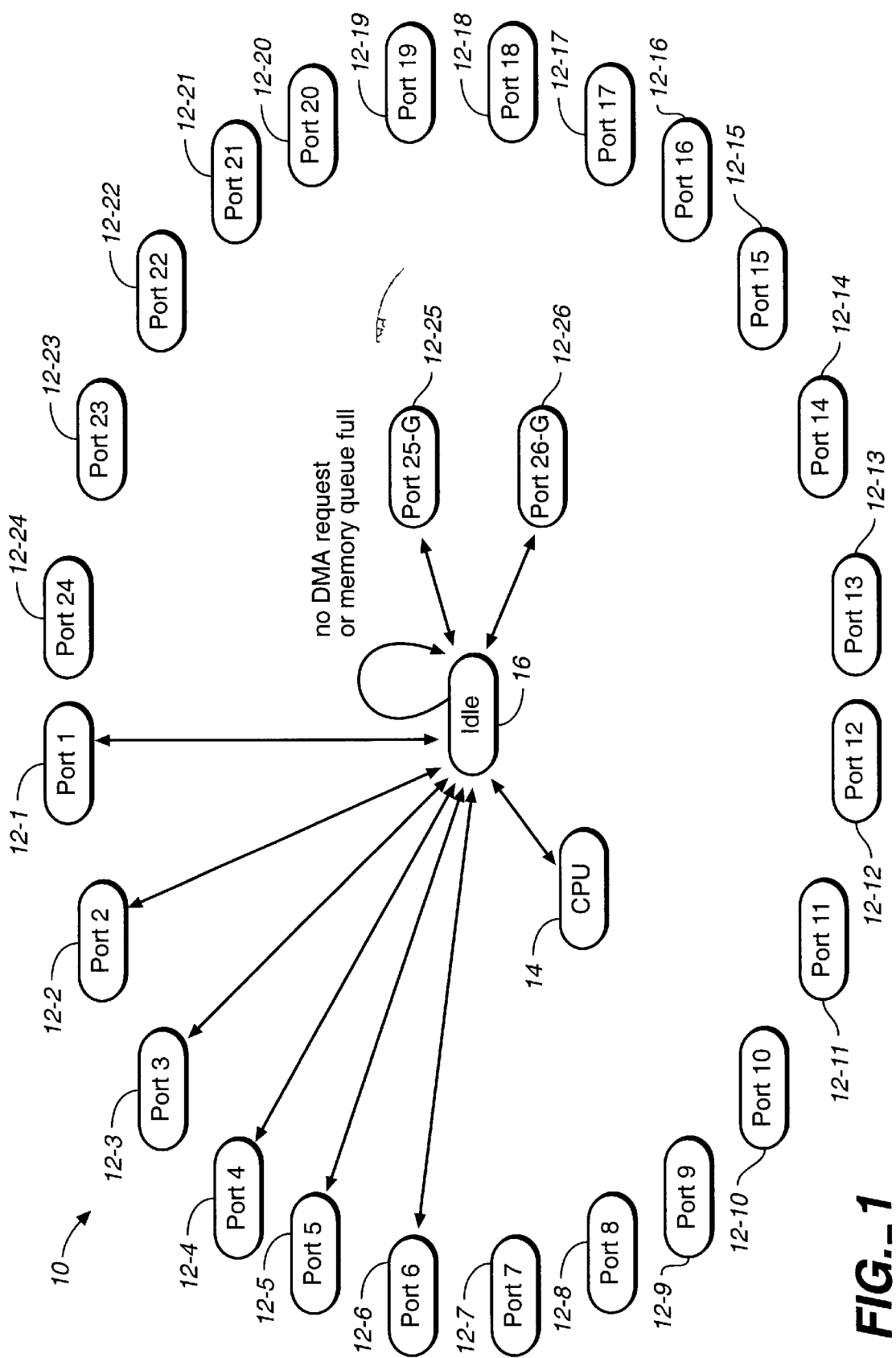
FIG._1

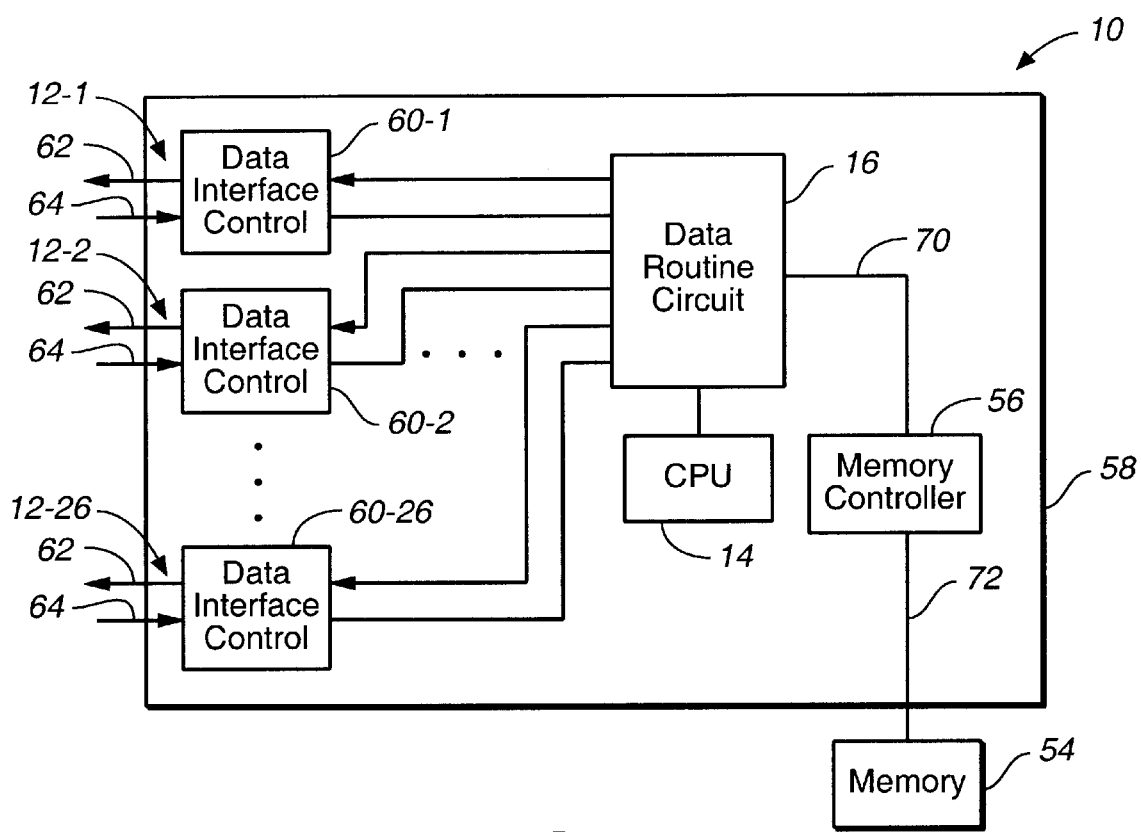
FIG._2

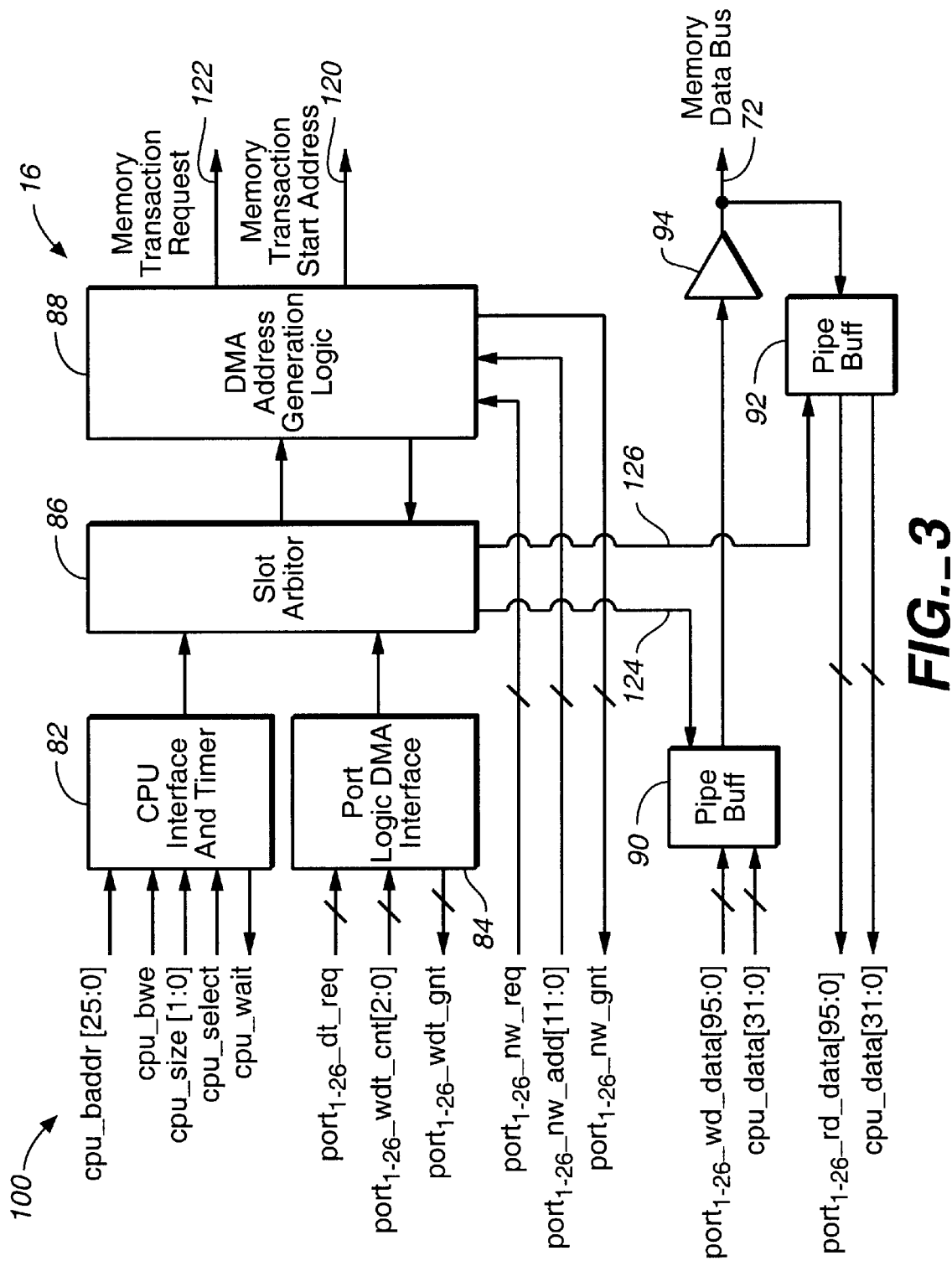
FIG._3

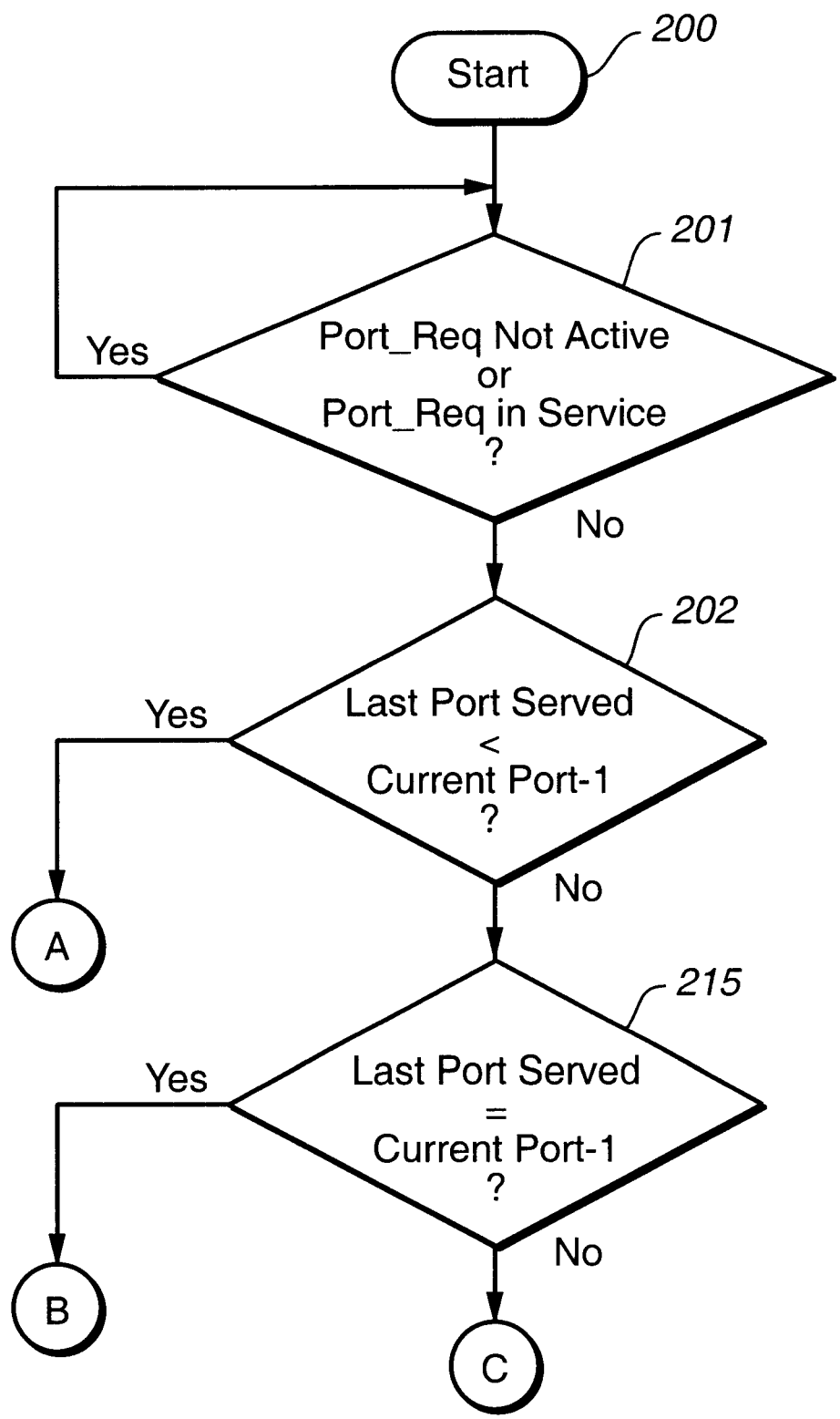
FIG._4A

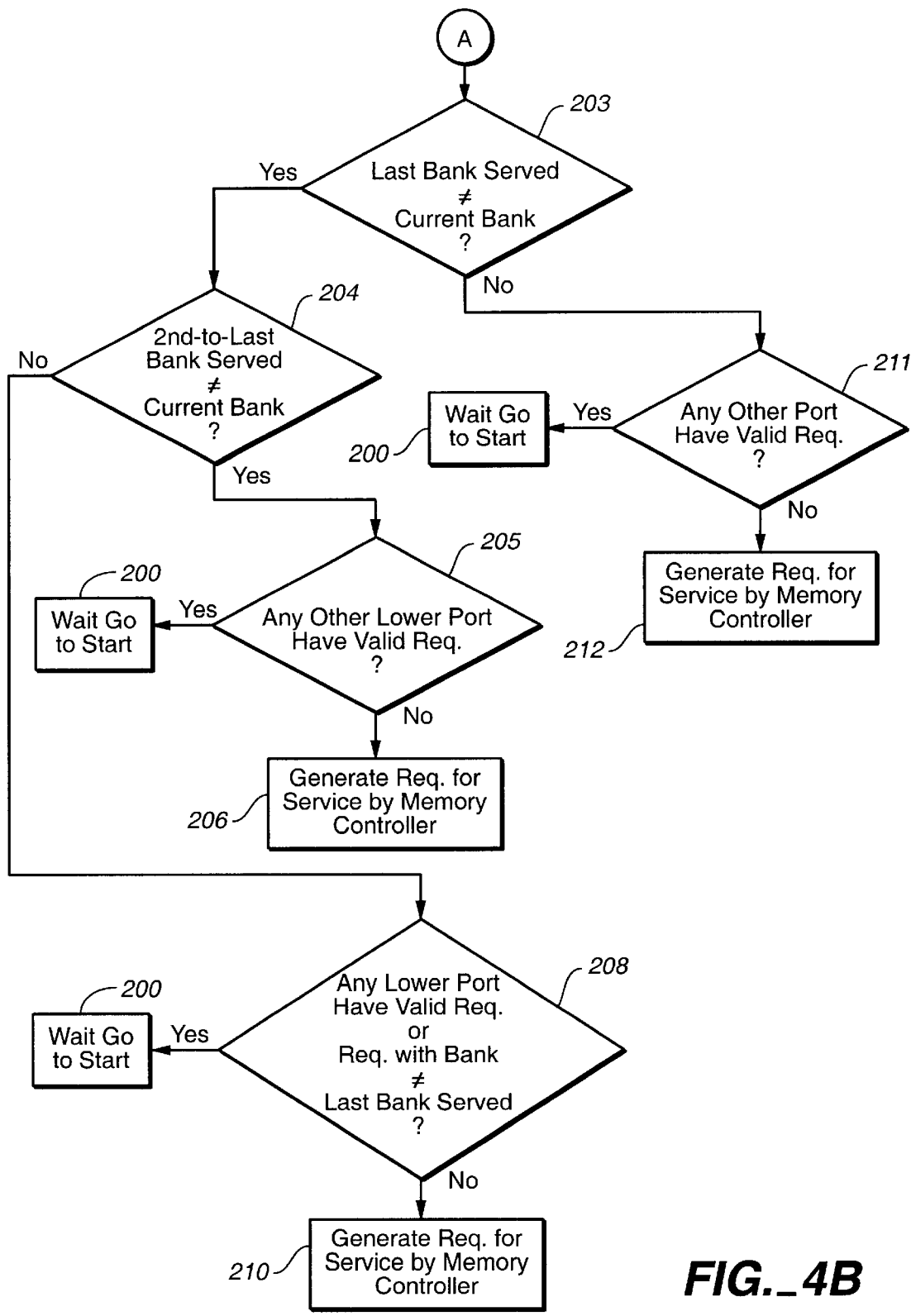
FIG._4B

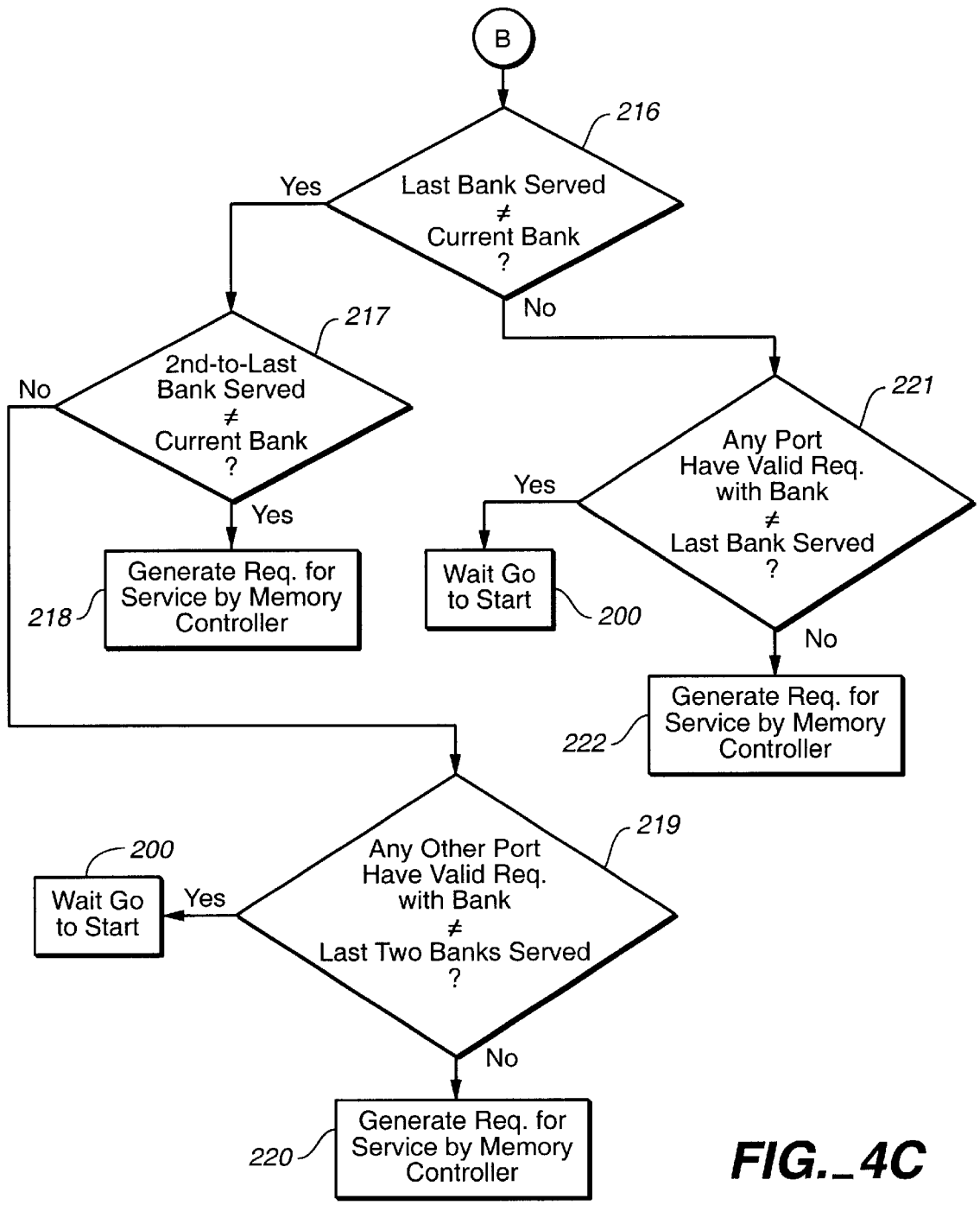
FIG._4C

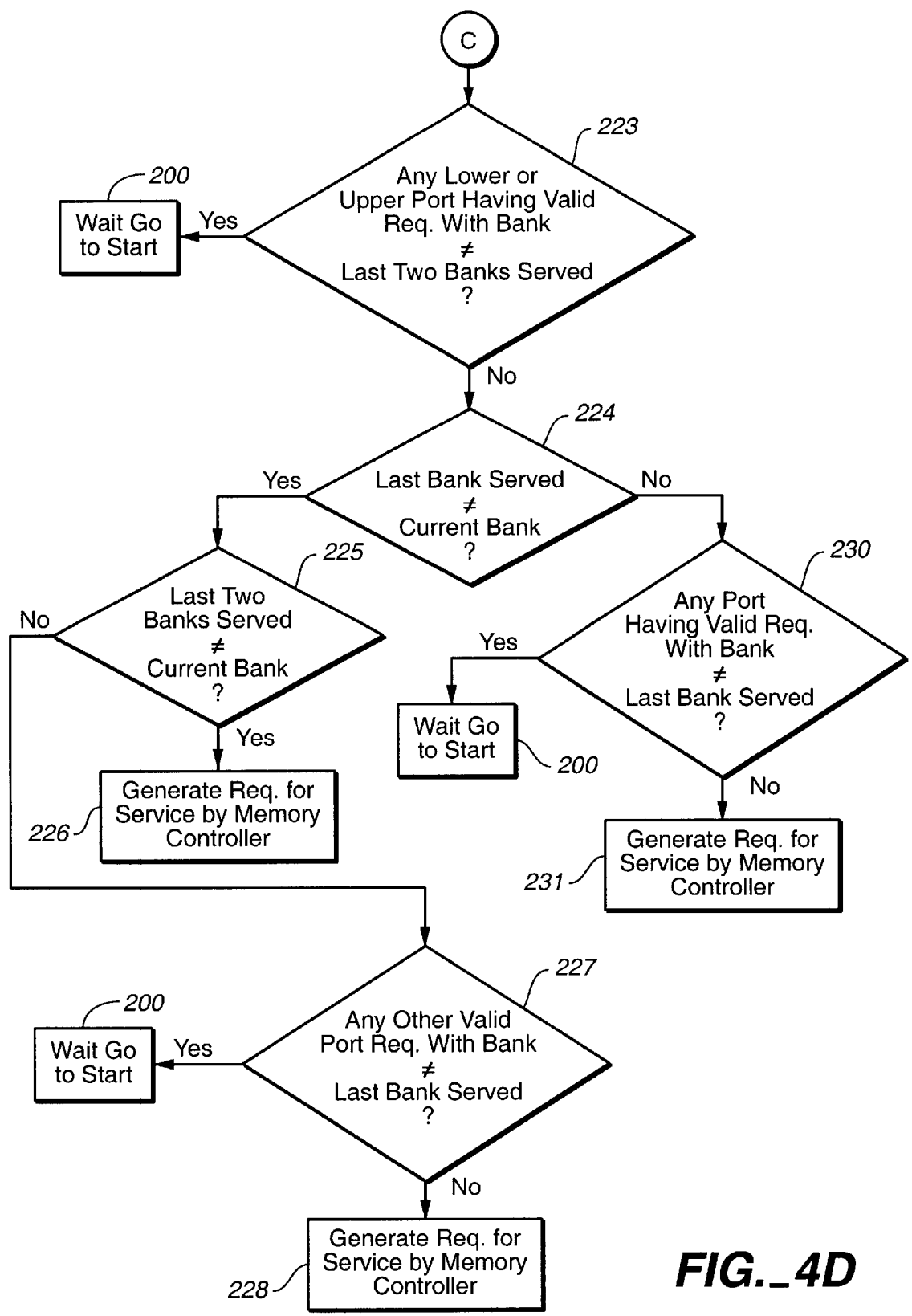
FIG._4D

ARBITRATION CIRCUIT WITH PLURAL ARBITRATION PROCESSORS USING MEMORY BANK HISTORY

BACKGROUND OF THE INVENTION

The present invention relates to semiconductor integrated circuits and, more particularly, to arbitration circuits for arbitrating access to a shared resource, such as a memory.

Arbitration circuits are used in a variety of applications, such as in data communication circuits, for arbitrating access to memory. A typical data communication circuit has several data ports, and each port can have more than one channel such as a transmit channel and a receive channel. Each port or channel arbitrates for access to the memory through the arbitration circuit. A typical arbitration circuit has a central authority, which arbitrates between simultaneous requests for access based on some predetermined priority scheme, such as a round-robin, a first-come-first-serve or a forced-priority scheme.

While typical arbitration priority schemes are relatively straightforward to implement, it becomes difficult for the arbitration circuit to utilize the entire bandwidth of the memory as data transfer rates of communication channels continue to increase. For example, certain local area networks have data transfer rates exceeding one gigabit per second. With a large number of ports and each port having a relatively high data transfer rate, the timing requirements become very tight on the arbitration decision process. This also requires a very precise placement and route of the integrated circuits and circuit board on which the data communication circuit and memory are fabricated. In addition, the inefficiencies of the arbitration process may require the memory to be run at higher frequencies to support the required bandwidth. These design constraints often lead to higher fabrication costs and difficulties in achieving the desired bandwidths.

An improved arbitration circuit is desired, which can support higher bandwidths at normal operating frequencies.

SUMMARY OF THE INVENTION

One aspect of the present invention relates to an a method of arbitrating access to a memory, which has a plurality of banks. The method includes arbitrating with a plurality of processors. Each processor is associated with one of a plurality of data ports and has a plurality of arbitration cycles, including a current cycle and a most recent cycle preceding the current cycle. Each processor receives memory access requests from all of the data ports, wherein each memory access request is associated with one of the memory banks. Each processor selectively grants the data port associated with that processor access to the memory for the current cycle based on the banks associated with the memory access requests of each data port, the data port that was granted access to the memory during the preceding cycle, and the memory bank that was accessed during the preceding cycle.

Another aspect of the present invention relates to an arbitration circuit, which includes a shared resource, a plurality of data ports, data routing circuitry and a plurality of arbitration processors. Each data port has an access request output indicating whether the data port requests access to the shared resource. The data routing circuitry selectively couples the plurality of data ports to the shared resource based on the access request outputs. Each arbitration processor is associated with a respective one of the plurality of data ports and selectively forwards the access request output of that data port to the data routing circuit based on predetermined arbitration rules and a status of all of the access request outputs. Only one of the arbitration processors forwards the access request output of its associated data port to the data routing circuitry at one time.

Yet another aspect of the present invention relates to an arbitration circuit, which includes a memory and a plurality of data ports. The memory has a plurality of banks. Each data port has means for generating a memory access request, which is associated with one of the memory banks. The arbitration circuit rotates access to the memory from one of the data ports to the next in a circular sequence and modifies the sequence based on the banks associated with the memory access requests of each data port, the data port that was most recently granted access to the memory, and the bank that was most recently accessed.

BRIEF DESCRIPTION OF THE DRAWINGS

FIG. 1 is a diagram, which schematically illustrates an arbitration process in a multi-port data communication system, according to one embodiment of the present invention.

FIG. 2 is a block diagram of the multi-port data communication system shown in FIG. 1, according to one embodiment of the present invention.

FIG. 3 is a block diagram of a data routing circuit within the communication system shown in FIGS. 1 and 2, according to one embodiment of the present invention.

FIGS. 4A–4D together form a flow chart illustrating an arbitration function performed in parallel for each channel in the data communication system shown in FIGS. 1–3, according to one embodiment of the present invention.

DETAILED DESCRIPTION OF ILLUSTRATIVE EMBODIMENTS

FIG. 1 is a diagram which schematically illustrates an arbitration process in a multi-port data communication system, according to one embodiment of the present invention. Data communication system 10 includes a plurality of ports 12-1 to 12-26, a central processing unit (CPU) 14 and a data routing circuit 16. Each port 12-1 to 12-26 and CPU 14 arbitrate for access to a shared resource (not shown), such as a memory, through data routing circuit 16.

Each port 12-1 to 12-26 can have one or more channels, such as a transmit channel and a receive channel, which are controlled by an internal data interface controller for communicating with common data links or carriers. For example, each port can include a serial wide area network (SWAN) controller or a local area network (LAN) controller. These controllers can be configured to implement any desired protocol such as Ethernet, Token Ring, DECNet, RS-232, Frame Relay (T1/E1 or fractional T1/E1), ISDN Basic Rate Interface (BRI), asynchronous transfer mode (ATM), asynchronous digital subscriber line (ADSL), and high level data link control (HDLC). Other types of data interface controllers or circuits can also be used. In one embodiment, ports 12-1 to 12-24 include Ethernet Media Access Control (MAC) layers having a data transfer rate of 10/100 megabits per second, and ports 12-25 and 12-26 include Ethernet controllers having a data transfer rate of 1.0 gigabits per second.

Data routing circuit 16 services ports 12-1 to 12-24 according to a modified round-robin and forced priority scheme. Ports 12-1 to 12-24 have a first priority. Ports 12-25 and 12-26, which have higher data transfer rates, have a second, higher priority than ports 12-1 to 12-24. CPU 14 has the highest priority and receives access to the memory bus through a watchdog timer maintained in data routing circuit 16.

Arbitration between ports 12-1 to 12-24 rotates from one port to the next in a circular sequence. However, several additional factors are considered when determining whether a particular port is granted access to the memory bus. For example, data routing circuit 16 checks whether the current port in the sequence is requesting access to the same bank of memory as the last bank served or the second-to-last bank served, and whether other ports have valid requests for access to a different bank than the last two banks served.

A typical memory, such as an SDRAM or flash memory, has several banks. Each bank has a plurality of memory cells with pre-charged bit lines. As the selected memory cells of a particular bank are accessed, the bit lines are driven to logic states representing the data being written to or read from those memory cells. When the access is completed, the bit lines are re-charged. Subsequent accesses to the same memory bank must therefore wait for a period of time sufficient to enable the bit lines to become re-charged.

The arbitration process implemented within data routing circuit 16 avoids access delays by skipping service to the current port in the round-robin sequence if that port requests access to a memory bank that was serviced in either of the last two memory accesses and there is another port having a valid memory request to a different bank than the last two banks accessed. In order to avoid overflows or underflows in the port that was skipped by data routing circuit 16, data routing circuit 16 considers servicing the skipped port immediately after servicing the next port. The overall effect is a very significant improvement in memory bus arbitration. Access to the memory rotates between banks, which results in continuous memory bus availability and a very high utilization of the memory bus bandwidth.

Data routing circuit 16 implements the arbitration scheme with a plurality of small parallel processors or finite state machines, one for each channel of each port in communication circuit 10. Each arbitration processor receives memory requests from its respective channel, any memory requests from other channels and ports, the bank associated with each memory request, an indication of the last port served, and an indication of the last two banks served. Based on this information, only one processor issues a request for access to the memory at any given time. In the embodiment shown in FIG. 1, data routing circuit has 52 parallel arbitration processors.

FIG. 2 is a block diagram illustrating multi-port data communication circuit 10 in greater detail, according to one embodiment of the present invention. Data communication circuit 10 includes communication ports 12-1 to 12-26, CPU 14, data routing circuit 16 and memory controller 56, which are fabricated on integrated circuit 58, and further includes external memory 54. Integrated circuit 58 can include any type of integrated circuit, such as an application specific integrated circuit (ASIC). Similarly, memory 54 can include any type of memory, such as a synchronous dynamic random access (SDRAM) memory or a flash memory.

Each port 12-1 to 12-26 has a respective data interface controller 60-1 to 60-26, which controls a transmit channel 62 and a receive channel 64. Data interface controllers 60-1 to 60-26 can be configured to implement any desired protocol as discussed above. Data interface controllers 60-1 to 60-26 are coupled to external memory 54 through data routing circuit 16 and memory controller 56. CPU 14 is also coupled to external memory 54 through data routing circuit 16 and memory controller 56.

Data routing circuit 16 is coupled to memory controller 56 over system bus 70. Memory controller 56 is coupled to external memory 54 over memory bus 72.

FIG. 3 is a block diagram, which illustrates data routing circuit 16 in greater detail according to one embodiment of the present invention. In FIG. 3, data routing circuit 16 is implemented as a direct memory access (DMA) controller with an arbitration function. Data routing circuit 16 includes CPU interface and timer circuit 80, port logic DMA interface 82, slot arbiter 86, DMA address generation logic 88, data pipe buffers 90 and 92 and output buffer 94.

CPU interface and timer circuit 82 receives memory access requests from CPU 14 and periodically passes the memory requests to slot arbiter 86. CPU 14 is coupled to circuit 82 through a plurality of inputs and outputs 100. When CPU 14 requests access to memory 54, it asserts CPU request line CPU_SELECT. CPU 14 also provides the size of the requested access, in bytes or words, on data size input CPU_SIZE[1:0] and provides the starting CPU bus address on CPU_BADDR[25:0]. CPU interface circuit 82 translates the CPU bus address into a corresponding memory bus address and forwards the translated address to DMA address generation logic 88, through slot arbiter 86. If the requested operation is a write, CPU 14 presents the data to be written to CPU_DATA[31:0], which is coupled to one of the inputs of data pipe 90, and asserts CPU write enable input CPU_BWE. If the requested operation is a read, CPU 14 waits to read the requested data from CPU_DADA[31:0], which is coupled to one of the outputs of data pipe 92.

Circuit 82 maintains a watchdog timer, which grants CPU 14 access to memory 54 each time the watchdog timer overflows. As the watchdog timer counts, circuit 82 asserts CPU_WAIT. If the next CPU memory request occurs before the watchdog timer has overflowed, slot arbiter 86 will not give CPU 14 access to memory bus 72. If the next CPU memory request occurs after the watchdog timer has overflowed, slot arbiter 86 grants CPU 14 access to memory 54. When slot arbiter 86 grants CPU 14 access, circuit 82 de-asserts CPU_WAIT. Slot arbiter 86 instructs DMA address generation logic 88 to perform the requested operation, beginning at the starting address provided by CPU 14, and provides appropriate select signals 124 and 126 to data pipes 90 and 92, respectively.

DMA address logic 88 performs the requested operation by issuing a memory transaction request on output 122 and presents the starting memory bus address on output 120. Memory controller 56 (shown in FIG. 2) then executes the requested transaction over memory bus 72. Once CPU 14 has been serviced, circuit 82 resets the watchdog timer and asserts CPU_WAIT.

CPU interface and timer circuit 82 also maintains a refresh timer, which is used for periodically refreshing memory controller 56 (shown in FIG. 2). During refresh, slot arbiter 86 grants none of the ports 12-1 to 12-26 or CPU 14 access to memory bus 72.

The other inputs of buffer 90 are coupled to the write data outputs of ports 12-1 to 12-26, which are together labeled as PORT1-26_WD_DATA[95:0]. The other outputs of buffer 92 are coupled to the read data inputs of ports 12-1 to 12-26, which are together labeled as PORT1-26_RD_DATA[95:0]. In one embodiment, data pipe buffers 124 and 126 have multiple channels for buffering data between memory bus 72, on one side of the buffers, and the data ports (including CPU 14) on the other side of the buffers. When a particular port 12-1 to 12-26 or CPU 14 has access to memory bus 72, slot arbiter 86 couples the selected channel of buffers 90 and 92 to memory bus 72, through select lines 124 and 126.

When one of the communication ports 12-1 to 12-26 requests access to memory bus 72, the corresponding data interface controller 60-1 to 60-26 asserts a new request PORT1-26_NW_REQ, where "1-26" designation in the signal name indicates one request line for each port. The newly requesting port also provides a starting address on a respective address bus PORT1-26_NW_ADD[11:0]. When DMA address generation logic 88 receives the new memory request, it asserts PORT1-26_NW_GNT and stores the starting address provided on PORT1-26_NW_ADD[11:0]. DMA address generation logic 88 then provides slot arbiter 86 with the number of the port that is requesting access and the particular memory bank being requested.

The corresponding data interface controller 60-1 to 60-26 also provides the size of the requested memory access to word count input PORT1-26_WDT_CNT[2:0] and asserts port data request input PORT1-26_DT_REQ. When slot arbiter 86 services the requesting port, port logic DMA interface 84 asserts the corresponding grant output PORT1-26_WDT_GNT and then removes the grant when the present memory access has completed. If the word or byte count provided on PORT1-26_WDT_CNT[2:0] requires multiple memory accesses, the requesting port maintains PORT1-26_DT_REQ until all memory accesses have been completed. As each memory access completes, DMA address generation logic 88 stores the starting address for the next memory access.

When slot arbiter 86 grants access to one of the ports 12-1 to 12-26, DMA address generation logic 88 provides the starting address to memory controller 56 over output 120 and issues a memory transaction request over output 122. If the selected transaction is a write, the current port having access to memory bus 72 provides the write data to the corresponding input of pipe buffer 90. If the selected transaction is a read, the current port waits for the read data to be presented on the corresponding output of pipe buffer 92.

Slot arbiter 86 includes a main arbitration processor and a plurality of port arbitration processors. There is one port arbitration processor for each channel of each port shown in FIGS. 1 and 2. Each port arbitration processor determines whether to pass its memory access request to the main arbiter while taking into account any memory access requests from the other ports, the bank of each memory request, the last port that was served and the last two banks that were served. Based on these factors, only one arbitration processor will forward its request to a main arbitration processor at any given time. The main arbitration processor handles arbitration between the selected memory access request that is forwarded by the port arbitration processors for ports 12-1 to 12-24, any memory access requests from CPU 14, and any memory access requests from ports 12-25 and 12-26. Each port arbitration processor can be implemented in hardware, software or a combination of both hardware and software. In one embodiment, each port arbitration processor is implemented as a finite state machine having the following function:

1) If the current port request is next in the round-robin sequence and satisfies the criteria that the requested memory bank is not the same as the last bank served or the second-to-last band served, the current arbitration processor will forward its request to the main arbiter;

2) If the current port request is next in the round-robin sequence, but the requested bank does not satisfy the bank criteria (i.e., the requested bank is the same as the last bank served or the second-to-last bank served), and there is another port requesting access to a bank that satisfies the bank criteria, then the current processor will not forward the current port request to the main arbiter;

3) If the current port request is next in the round-robin sequence, but the requested bank does not satisfy the bank criteria and there are no other ports requesting access to a bank that satisfies the bank criteria, then the current processor will forward the current port request to the main arbiter;

4) If the current port request is not next in the round-robin sequence, and requests access to a bank that satisfies the bank criteria, and the next port in the round-robin sequence that requests access does not satisfy the bank criteria, and there are no other ports ahead of the current port that are requesting access to a bank which satisfies the bank criteria, the current processor will forward the current port request to the main arbiter; and 5) If the current processor was not able to forward its port request to the main arbiter due to condition (2) above and is therefore skipped in the round-robin sequence, and after other banks have been serviced the current port request satisfies the bank condition, the current processor will forward the current port request to the main arbiter.

FIGS. 4A–4D together form a flow chart illustrating the flow through each port arbitration processor for implementing the arbitration function described above, according to one embodiment of the present invention. Referring to FIG. 4A, the process for servicing memory requests for each port starts at step 200. At step 201, if the port request input is not active or if a port request for that port is already being serviced, the arbitration processor remains in a wait state, at step 201. If the port request input is active and the port is not being serviced, then the arbitration processor checks whether the current port number minus one (port #–1) is greater than the last port served, at step 202. If so, then the current port is one of the next ports to be served in the round-robin sequence, and the arbitration processor proceeds to leg "A" of the flowchart, which begins at step 203 at the top of FIG. 4B.

At step 203, the arbitration processor checks whether the currently requested bank is different than the last bank served (i.e. accessed). If so, the arbitration processor checks whether the currently requested bank is different than the second-to-last bank served, at step 204. If both of these bank conditions are satisfied, then the arbitration processor proceeds to step 205 and checks whether any other lower port in the round-robin sequence (i.e. any port between the last port served and the current port) has a valid memory request. In one embodiment, a memory request is valid if the requesting port number is greater than or equal to the number of the last port served and the bank requested by that port is not equal to the last two banks served. This calculation can be performed for all ports within each port processor through a multiplier circuit, for example.

If there are no lower ports having a valid memory request, then the current arbitration processor forwards the current memory request to the main arbiter, which instructs the DMA controller to generate a request for service by memory controller 56 (shown in FIG. 2), at step 206. The current port is then served. If, at step 205, there is another lower port having a valid memory request, then the presently requesting port is not served and the arbitration processor returns to step 200 for the next decision cycle.

Referring back to step 204, if the currently requested bank is not equal to the last bank served but is equal to the second-to-the-last bank served, the arbitration processor checks the status of the other port's memory requests, at step 208. If any other lower port has a memory request that satisfies at least the first bank criteria in step 203, then the current port is not served and the current arbitration processor returns to step 200. If there are no other lower ports having a valid memory request or a memory request with the requested bank being different than the last bank served, then the presently requesting port is served and the DMA controller issues a request for service by memory controller 56, at step 210.

Returning to step 203, if the currently requested bank is equal to the last bank served, then service of the presently requesting port is not preferred, and arbitration processor proceeds to step 211. At step 211, the arbitration processor checks whether any port (regardless of the round-robin priority order) has a valid memory request. If so, the presently requesting port must wait, and the current arbitration processor returns to step 200. If not, the presently requesting port is served, and the DMA controller generates a request for service from memory controller 56, at step 212.

Referring back to step 202 of FIG. 4A, if the current port number minus one (port #−1) is not greater than the last port served, then the arbitration processor proceeds to step 215 and checks whether the currently requesting port is the next adjacent port from the last port served in the round-robin sequence.

In one embodiment of the present invention, each arbitration processor maintains a "last port served" register, which stores an indication of the last data port that was granted access to the memory. If any data port in the round-robin sequence is skipped for failing the bank criteria, the last port served register is not updated until the skipped port is served. This ensures that the skipped data port is considered for service first with each subsequent arbitration cycle. If, at step 215, the currently requesting port is the same as the port identified by the last port served register, the arbitration process proceeds to leg "B" of the flowchart, which begins at step 216 in FIG. 4C.

In an alternative embodiment, each arbitration processor maintains a status flag for each data port (or channel), which indicates whether that port was previously skipped in the round-robin sequence. In this embodiment, the last port served register can be updated with each arbitration cycle and the status flags are used to give priority to skipped data ports.

At step 216, the arbitration processor checks whether the bank requested by the current port is different than the last bank served. If so, the processor checks whether the bank requested is different from the second-to-last bank served, at step 217. If so, the requested bank can be served and the arbitration processor instructs the DMA controller to generate a request for service by memory controller 56, at step 218. If not, service to the presently requesting port may have to wait, and the arbitration processor proceeds to step 219.

At step 219, the arbitration processor determines whether any other port (or channel) has a valid memory request where the requested bank is not equal to the last bank served or the second-to-last bank served. If no other such port exists, the arbitration processor proceeds to step 220 and instructs the DMA controller to generate a request for service by memory controller 56. If there is another port having a valid memory request, then the arbitration processor returns to step 200 in FIG. 4A and waits for service.

Referring back to step 216, if the bank requested by the current port is not different then the last bank served, then the arbitration processor checks whether any other port has a memory request where the requested bank is different from the last bank served, at step 221. If such a port does not exist, then the arbitration processor instructs the DMA controller to generate a request for service by memory controller 56, at step 222. If such a port exists, then the arbitration processor returns to step 200 in FIG. 4A and waits for service.

Again, referring back to step 215 in FIG. 4A, if the currently requesting port is not the next subsequent port in the round-robin order from the last port served, then there may be another, lower port in the round-robin order between the last port served and the current port that had previously been skipped for failing a bank criteria. The arbitration processor proceeds to leg "C", which begins at step 223 in FIG. 4D.

At step 223, the arbitration processor checks whether there is any port between the last port served and the present port (i.e. any port below the present port and any port above the last port served) in the priority order having a valid memory access request, with the requested bank being not equal to the last bank served or the second-to-last bank served. If so, that port gets priority, and the currently requesting port does not forward its port request to the main arbiter. The arbitration algorithm returns to step 200 in FIG. 4A. If such a port does not exist, the arbitration processor proceeds to step 224 where the current memory request is checked to see whether the requested bank now satisfies the bank criteria.

At step 224, the arbitration processor checks whether the currently requested bank is different from the last bank served. If so, the processor proceeds to step 225 where it checks whether the currently requested bank is different from the second-to-last bank served. If so, a request for service by memory controller 26 is generated at step 226. If not, the processor checks whether there is any other port having a memory request where the requested bank is not the same as the last bank served, at step 227. If not, the arbitration processor forwards the memory request to the main arbiter such that a request for service by memory controller 26 can be generated at step 228. If there is another port having a memory request where the requested bank is not the same as the last bank served, the processor returns to step 200 in FIG. 4A.

Referring back to step 224, if the currently requested bank is not different from the last bank served, then the arbitration processor checks whether there is any other port having a memory request with the requested bank being not equal to the last bank served, at step 230. If not, the arbitration processor forwards the memory request of the current port to the main arbiter, where a request for service by memory controller 56 can be generated at step 231. If so, the arbitration processor returns to step 200 in FIG. 4A.

As discussed above, the algorithm shown in FIGS. 4A–4D is performed for each channel in the communication system. Thus, simultaneous decisions are made for each channel as to whether a particular port's memory access request will be forwarded to the main arbiter and serviced by memory controller 56. This allows a greater number of factors to be considered in the arbitration process, which can be used to maximize the memory bus bandwidth. For example, the arbitration process adjusts priority within the round-robin sequence to avoid accessing the last bank served or the second-to-last bank served in the present memory cycle. Rotating access to the memory banks provides continuous memory bus availability and a very high utilization of the memory bus bandwidth, which was not achievable by typical arbitration schemes. Also, with parallel processing for each port, the arbitration circuitry can be operated at normal system clock speeds and does not require unusually tight placement and routing specifications. The arbitration circuit can therefore be implemented easily and cheaply within a wide variety of semiconductor integrated circuit applications.

Although the present invention has been described with reference to preferred embodiments, workers skilled in the art will recognize that changes may be made in form and detail without departing from the spirit and scope of the invention. For example, a wide variety of data routing circuits and configurations can be used within the overall arbitration scheme discussed above. Each arbitration processor can be implemented in hardware or software, such as with combinational logic, a finite state machine or a programmable computer, for example. The term "port" used in the specification and the claims can include any data input, output or channel, for example. Likewise, the term "coupled" can include various types of connections or couplings and can include a direct connection or a connection through one or more intermediate components.

What is claimed is:

1. A method of arbitrating access to a memory having a plurality of banks, the method comprising:

(a) arbitrating with a plurality of processors, wherein each processor is associated with one of a plurality of data ports and has a plurality of arbitration cycles, including a current cycle and a most recent cycle preceding the current cycle;

(b) receiving any memory access requests from all of the data ports with the each of the processors, wherein each memory access request is associated with one of the memory banks; and (c) with each of the processors, selectively granting the data port associated with that processor access to the memory for the current cycle based on the banks associated with the memory access requests of each data port, the data port that was granted access to the memory during the preceding cycle, and the memory bank that was accessed during the preceding cycle, wherein selectively granting comprises defining a priority sequence through the plurality of data ports, whereby priority rotates from one of the data ports to a next subsequent one of the data ports in the sequence with each arbitration cycle.

2. The method of claim 1 wherein step (c) of selectively granting comprises:

(c)(1) defining the priority sequence as a circular priority sequence through the plurality of data ports.

3. The method of claim 2 wherein step (c) of selectively granting access further comprises:

(c)(2) granting access to the data port associated with the processor if: that data port is the next subsequent data port; and the bank associated with the memory request of that data port satisfies a first bank criteria, wherein the first bank criteria is satisfied if the associated bank is different than the memory bank that was accessed in the most recent cycle.

4. The method of claim 3 wherein the plurality of arbitration cycles further includes a next most recent cycle preceding the most recent cycle and wherein step (c)(2) of granting access further comprises:

granting access to the data port associated with the processor if: that data port is the next subsequent data port; and the bank associated with the memory request of that data port satisfies the first bank criteria and a second bank criteria, wherein the second bank criteria is satisfied if the associated bank is different than the memory bank that was accessed in the next most recent cycle.

5. The method of claim 4 wherein step (c) of selectively granting access further comprises:

(c)(3) denying access to the data port associated with the processor if: that data port is the next subsequent data port; the bank associated with the memory request of that data port does not satisfy the first or second bank criteria; and the bank associated with the memory request of one of the other data ports satisfies the first and second bank criteria.

6. The method of claim 5 wherein step (c) of selectively granting access further comprises:

(c)(4) subsequently granting access to the data port associated with the processor in a next subsequent one of the arbitration cycles in which the bank associated with the memory request of that data port satisfies the first and second bank criteria.

7. The method of claim 4 wherein step (c) of selectively granting access further comprises: (c)(3) granting access to the data port associated with the processor if: that data port is the next subsequent data port; the bank associated with the memory request of that data port does not satisfy the first and second bank criteria; and none of the banks associated with the memory requests of the other data ports satisfies both the first and second bank criteria.

8. The method of claim 4 wherein step (c) of selectively granting access further comprises:

(c)(3) granting access to the data port associated with the processor if: that data port is not the next subsequent data port; the bank associated with the memory request of that data port satisfies the first and second bank criteria; the bank associated with the memory request of the next subsequent data port in the sequence does not satisfy the first and second bank criteria; and there are no other ones of the data ports that are between the next subsequent data port and the data port associated with the processor in the sequence in which the bank associated with the memory request of the other data port satisfies the first and second bank criteria.

9. An arbitration circuit comprising:

a shared resource comprising a memory having a plurality of banks;

a plurality of data ports, wherein each data port generates an access request output indicating whether the data port requests access to one of the memory banks of the shared resource, which is associated with the access request output;

data routing circuitry, which selectively couples the plurality of data ports to the shared resource based on the access request outputs; and a plurality of arbitration processors, wherein each arbitration processor is associated with a respective one of the plurality of data ports and selectively forwards the access request output of that data port to the data routing circuitry based on predetermined arbitration rules and a status of all of the access request outputs, wherein only one of the arbitration processors forwards the access request output of its associated data port to the data routing circuitry at one time, and wherein each arbitration processor comprises means for defining a priority sequence through the plurality of data ports, whereby priority rotates from one of the data ports to a next subsequent one of the data ports in the sequence with each of a plurality of arbitration cycles, which include a current cycle, a most recent cycle and a next most recent cycle preceding the current cycle, and comprises means for granting access to the data port associated with the processor if that data port is the next subsequent data port and the bank associated with the memory request output of that data port satisfies a first bank criteria, wherein the first bank criteria is satisfied if the associated bank is different than the memory bank that was accessed in the most recent cycle.

10. The arbitration circuit of claim 9 wherein:

the priority sequence comprises a circular priority sequence through the plurality of data ports; and the means for granting access grants access to the data port associated with the processor if that data port is the next subsequent data port and the bank associated with the memory request output of that data port satisfies the first bank criteria and a second bank criteria, wherein the second bank criteria is satisfied if the associated bank is different than the memory bank that was accessed in the next most recent cycle.

11. The arbitration circuit of claim 10 wherein each arbitration processor further comprises:

means for denying access to the data port associated with the processor if that data port is the next subsequent data port, the bank associated with the memory request output of that data port does not satisfy the first or second bank criteria, and the bank associated with the memory request output of one of the other data ports satisfies the first and second bank criteria.

12. The arbitration circuit of claim 11 wherein each arbitration processor further comprises:

means for subsequently granting access to the data port associated with the processor in a next subsequent one of the arbitration cycles in which the bank associated with the memory request output of that data port satisfies the first and second bank criteria.

13. The arbitration circuit of claim 10 wherein each arbitration processor further comprises:

means for granting access to the data port associated with the processor if that data port is the next subsequent data port, the bank associated with the memory request output of that data port does not satisfy the first and second bank criteria, and none of the banks associated with the memory request outputs of the other data ports satisfies both the first and second bank criteria.

14. The arbitration circuit of claim 10 wherein each arbitration processor further comprises:

means for granting access to the data port associated with the processor if that data port is not the next subsequent data port, the bank associated with the memory request output of that data port satisfies the first and second bank criteria, the bank associated with the memory request output of the next subsequent data port in the sequence does not satisfy the first and second bank criteria, and there are no other ones of the data ports that are between the next subsequent data port and the data port associated with the processor in the sequence in which the bank associated with the memory request output of the other data port satisfies the first and second bank criteria.

15. An arbitration circuit comprising:

a memory having a plurality of banks;

a plurality of data ports, wherein each data port has means for generating a memory access request, which is associated with one of the memory banks; and means for rotating access to the memory from one of the data ports to the next in a circular sequence and for modifying the sequence if the memory access request from the data port currently having access to the memory in the circular sequence is associated with the memory bank that was most recently accessed and if the memory access request from another of the data ports is associated with a different one of the memory banks.

* * * * *